United States Patent [19]

Eilers

[11] Patent Number: 5,588,981

[45] Date of Patent: Dec. 31, 1996

[54] APPARATUS FOR FORMING WIDE MOUTH GLASSWARE

[75] Inventor: Wayne E. Eilers, Perrysburg, Ohio

[73] Assignee: Owens-Brockway Glass Container Inc., Toledo, Ohio

[21] Appl. No.: 281,718

[22] Filed: Jul. 28, 1994

[51] Int. Cl.$^6$ .................................................. C03B 9/193
[52] U.S. Cl. ............................... 65/241; 65/265; 65/267; 65/356
[58] Field of Search ....................... 65/68, 72, 76, 65/79, 82, 227, 229, 240, 241, 265, 267, 356

[56] References Cited

U.S. PATENT DOCUMENTS

| | | | |
|---|---|---|---|
| 1,259,281 | 3/1918 | Peiler | 65/80 |
| 1,618,747 | 2/1927 | Bartlett | 65/80 |
| 1,781,565 | 11/1930 | Beatty | 65/80 |
| 1,876,005 | 9/1932 | Hoge et al. | 65/241 |
| 1,888,318 | 11/1932 | Hofmann | 65/241 |
| 1,911,119 | 5/1933 | Ingle | 65/219 |
| 1,981,692 | 11/1934 | Dichter | 65/264 |
| 2,289,046 | 7/1942 | Rowe | 65/64 |
| 2,688,823 | 9/1954 | Weber | 65/75 |
| 2,864,124 | 12/1958 | Strauss | 65/229 |
| 3,024,571 | 3/1962 | Abbott et al. | 65/311 |
| 3,147,105 | 9/1964 | Abbott et al. | 65/361 |
| 3,198,617 | 8/1965 | Denman et al. | 65/207 |
| 3,233,999 | 2/1966 | Mumford | 65/359 |
| 3,241,941 | 3/1966 | Abbott et al. | 65/235 |
| 3,329,492 | 7/1967 | Kinsley | 65/227 |
| 3,434,820 | 3/1969 | Zappia et al. | 65/223 |
| 3,490,891 | 1/1970 | Fouse | 65/224 |
| 3,580,712 | 5/1971 | Mumford | 65/307 |
| 3,617,233 | 11/1971 | Mumford | 65/307 |
| 3,623,856 | 11/1971 | Keller | 65/169 |
| 3,672,860 | 6/1972 | Keller | 65/208 |
| 3,721,542 | 3/1973 | Keller | 65/169 |
| 3,732,088 | 5/1973 | Zappia | 65/229 |
| 3,803,877 | 4/1974 | Becker | 65/241 |
| 3,846,103 | 11/1974 | Rowe | 65/79 |
| 4,004,906 | 1/1977 | Rowe | 65/239 |
| 4,255,179 | 3/1981 | Foster | 65/79 |
| 4,274,859 | 6/1981 | Mumford | 65/314 |
| 4,276,076 | 6/1981 | Fenton | 65/241 |
| 4,652,291 | 3/1987 | Hirt | 65/68 |
| 4,680,050 | 7/1987 | Doud | 65/79 |
| 4,830,653 | 5/1989 | Montemayor et al. | 65/260 |
| 5,271,757 | 12/1993 | Houben | 65/239 |

*Primary Examiner*—Donald E. Czaja
*Assistant Examiner*—Sean Vincent

[57] ABSTRACT

A method and apparatus for making wide-mouth glassware providing a solid blank mold, providing a split blow mold, providing a split neck ring, providing a plunger carrier having a movable plunger therein, moving the blank mold upwardly to position for receiving a gob of glass, positioning the neck ring on the blank mold, delivering a gob of glass to said blank mold, positioning plunger carrier into engagement with said neck ring, extending the plunger into said blank mold to deform the glass and force the glass into the neck ring to form a parison, thereafter retracting the plunger and moving the plunger carrier away from the neck ring, lowering the blanks, moving the neck ring with the parison thereon to a position between the open blow mold halfs while maintaining the parison in vertical upright position, closing the blow mold about the parison, opening the neck ring to release the parison in the blow mold, returning the neck ring to its original position adjacent the blank mold, blowing the parison into a hollow glass article, opening the blow mold, and removing the blown glass article. Preferably the glass gob is delivered through the neck ring. Also preferably the extended plunger relative to said carrier begins to press glass as the plunger carrier moves into engagement with said neck ring.

23 Claims, 13 Drawing Sheets

FIG. 1
FIG. 2
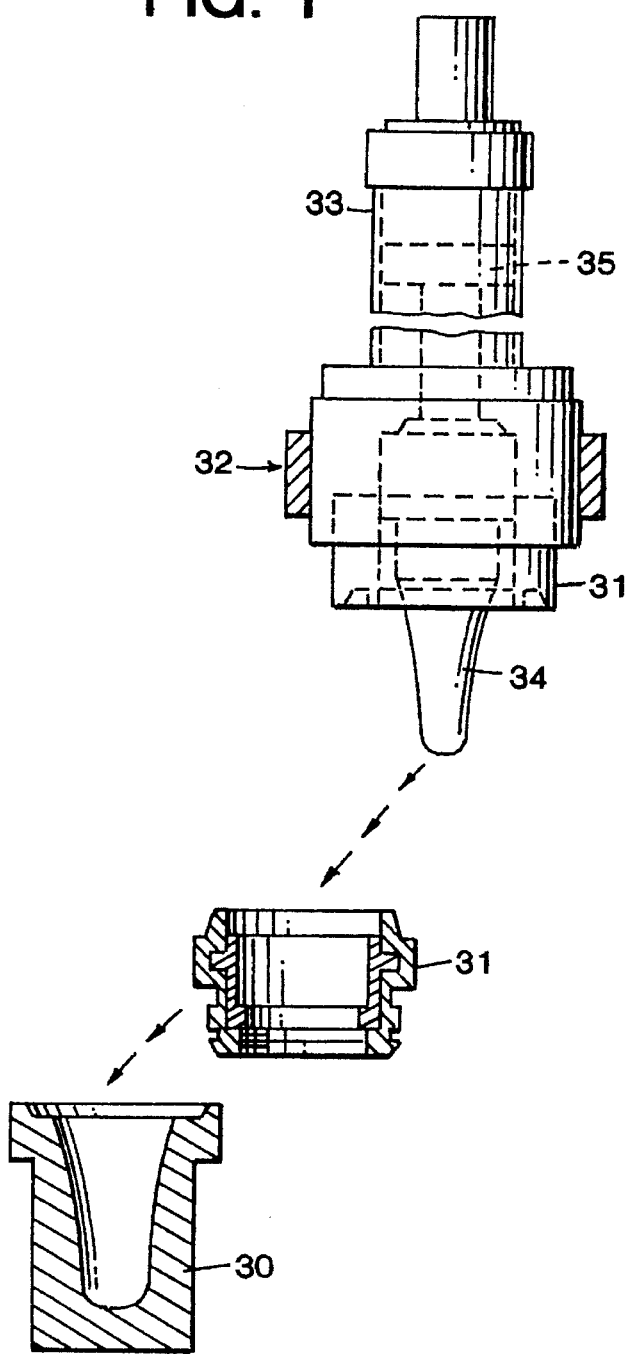
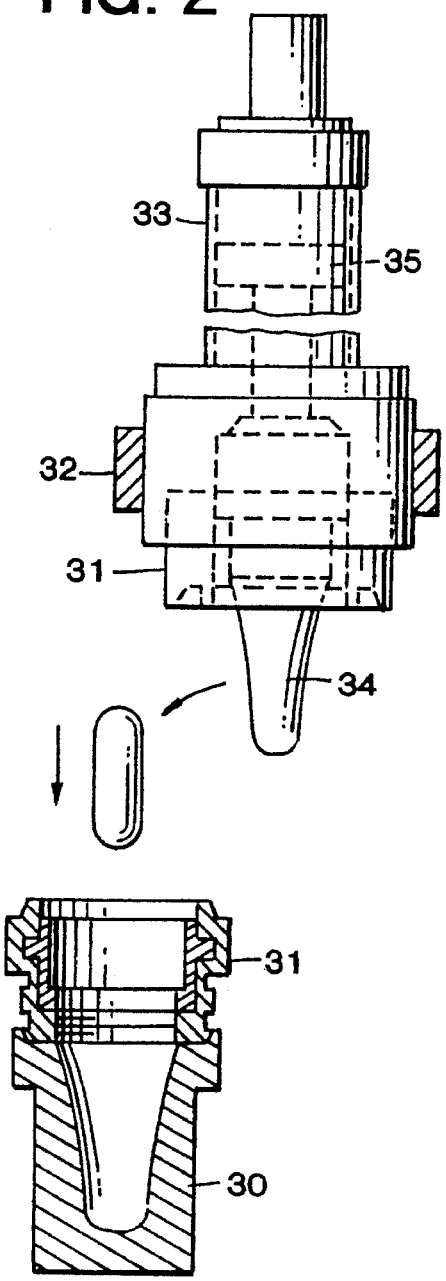

5,588,981

1

APPARATUS FOR FORMING WIDE MOUTH GLASSWARE

This invention relates to a method and apparatus for forming wide mouth glassware.

BACKGROUND AND SUMMARY OF THE INVENTION

In one commonly known type of apparatus for forming glassware, known as an I.S. type apparatus, parisons are formed in inverted positions by pressing and then inverted and transferred to a blow mold for blowing into a final product such as a container. Such machines are shown for example, in U.S. Pat. Nos. 1,911,119, 2,289,046, and 3,024,571. In U.S. Pat. No. 4,004,906, there is disclosed an apparatus for forming a parison in upright position and transferring it to a blow mold by an apparatus which utilizes an endless chain trained over two sprockets, one of which is located adjacent to the free end of a neck ring arm and the other of which is located in the pivotal mounting of the neck ring arm in order to isolate the arm.

Among the objectives of the present invention are to provide a novel method and apparatus which is intended to form wide mouth glassware; which method and apparatus provides wide mouth glassware and allows the parison to be formed more quickly with less pressing force such that the glassware is better quality; wherein single or multiple glass gobs can be processed; wherein the gobs of glass are preferably fed through the neck ring into a vertical solid blank; wherein the process provides for a quicker and more accurate alignment for the plunger with less movement of the glass within the blank; wherein the process does not require a funnel mechanism nor a baffle mechanism and wherein the apparatus is capable of functioning in a reliable manner at high speeds with minimal maintenance.

In accordance with the invention, the method and apparatus for making wide-mouth glassware comprises providing a solid blank mold, providing a split blow mold, providing a split neck ring, providing a plunger carrier having a movable plunger therein, moving the blank mold upwardly to position for receiving a gob of glass, positioning the neck ring on the blank mold, delivering a gob of glass to said blank mold, positioning plunger carrier into engagement with said neck ring, extending the plunger into said blank mold to deform the glass and force the glass into the neck ring to form a parison, thereafter retracting the plunger and moving the plunger carrier away from the neck ring, lowering the blanks, moving the neck ring with the parison thereon to a position between the open blow mold halves while maintaining the parison in vertical upright position, closing the blow mold about the parison, opening the neck ring to release the parison in the blow mold, returning the neck ring to its original position adjacent the blank mold, blowing the parison into a hollow glass article, opening the blow mold, and removing the blown glass article. Preferably the glass gob is delivered through the neck ring. Also preferably the extended plunger relative to said carrier begins to press glass as the plunger carrier moves into engagement with said neck ring.

The method and apparatus preferably includes providing a neck ring arm, pivoting said arm about a first horizontal axis providing a neck ring holder for holding said neck ring, pivotally supporting said neck ring holder on said neck ring arm. The method and apparatus further comprises providing a transfer arm, pivoting one end of the transfer arm about a second fixed horizontal axis spaced from the first horizontal axis, pivoting the other end of the transfer arm to the neck ring holder and pivotally connecting said transfer arm to said first horizontal axis such that the pivotal movement of said neck ring arm about said first horizontal axis causes said transfer arm to move about said second horizontal axis and maintain said parison in vertical upright position as the neck ring is moved to a position between the open blow mold.

DESCRIPTION OF THE DRAWINGS

FIGS. 1, 2, 3, 4 and 5 are diagrammatic views showing the successive steps in the method embodying the invention.

DESCRIPTION OF THE PREFERRED EMBODIMENTS

Figure 3:
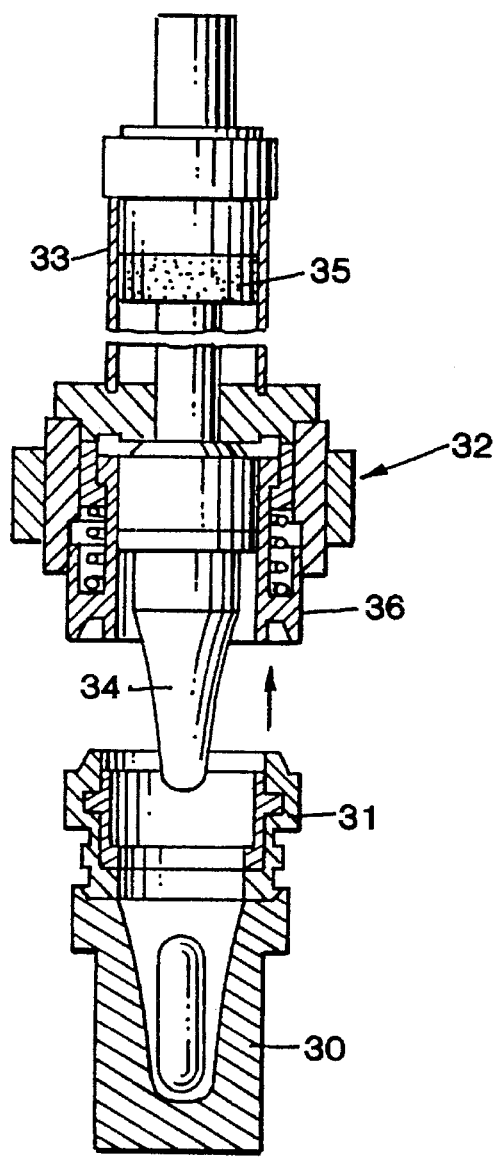
Figure 4:
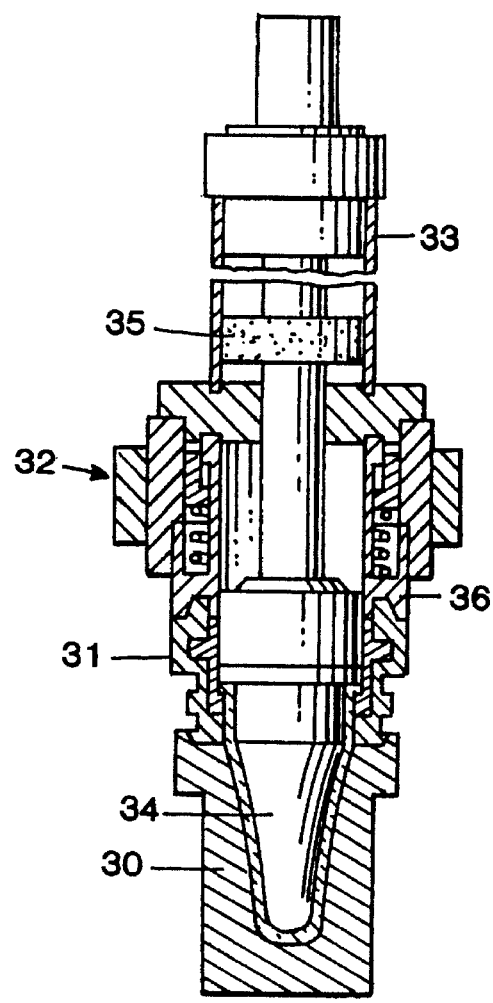

The method and apparatus embodying the invention relates to the well known I.S. process wherein a glass gob is formed at a blank station and transferred to a blow molding station for blowing into an article of glassware such as a glass container. Referring to FIGS. 1–5, in accordance with the invention, the method utilizes a solid blank mold 30 provided at the blank station. The vertical solid blank mold 30 is moved upward into load position. Simultaneously, a split neck ring 31 is moved into load position over the blank mold 30 and a gob of molten glass is delivered through the neck ring 31 into the blank mold 30 (FIG. 2). A plunger carrier 32 supports a plunger cylinder 33 which includes a plunger 34 mounted on a piston 35. The plunger carrier 32 moves the plunger cylinder 33 over and down into position on top of the neck ring 31 immediately after the gob of glass goes through the neck ring 31 (FIG. 3). While the plunger cylinder 33 is being lowered into position, the extended plunger 34 begins to press into the glass (FIG. 3). A retractable alignment and clamping sleeve 36 provides accurate alignment of the plunger 34 through the neck ring 31 and into the glass gob before the plunger cylinder 33 is completely seated on top of the neck ring 31 and also keeps the neck ring 31 from pressing open during the pressing cycle. When the plunger carrier 32 positions the plunger cylinder 33 into its final position on top of the neck ring 31, the independently controlled plunger cylinder 33 moves piston 35 to press the plunger 34 deeper into the glass gob to complete its stroke and force the glass up into the neck ring 31 (FIG. 4). This process differs from the conventional press and blow process on an I.S. machine in that in the present method the glass moves only from the bottom of the blank mold 30 up to the neck ring 31 as contrasted to the conventional I.S. method where the glass moves from the bottom of the inverted blank up to a baffle end and then back down to the neck ring. Less movement of the glass in the present method allows the parison to be formed more quickly with less pressing force and enables the method to make a better quality container.

Figure 5:
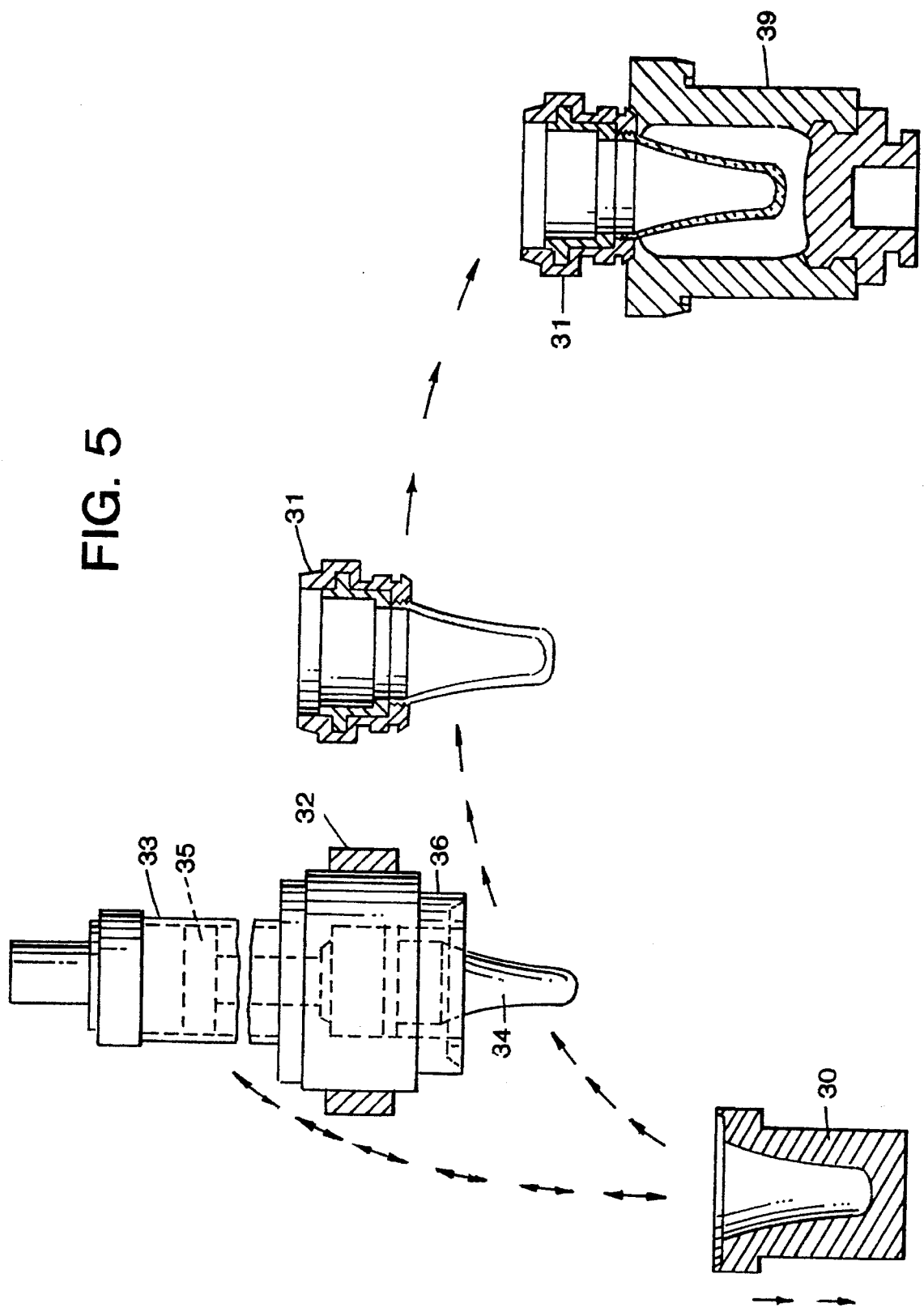

After pressing, the plunger cylinder 33 retracts the plunger 34 and the plunger carrier 32 moves the plunger cylinder 33 up and out of the way (FIG. 5). The parison is then moved over to a blow mold 39 at the blowing station simultaneously with the downward movement of the solid blank mold 30 (FIG. 5). The parison is thus transferred in a vertical upright position unlike the inverted position of conventional processes. This allows the arc of movement of the parison to be smaller which reduces the centrifugal forces which swing the parison outward. Therefore, less time is needed for the parison to come to rest directly over the bottom plate of the blow mold before final blowing can start (FIG. 5). After the neck ring 31 is opened and releases the parison into the blow mold 39, the blowing of the parison in the blow mold 39 occurs (FIG. 5), and the subsequent transfer of the container from the blow mold 39 to a conveyor is performed in the normal manner of the I.S. machine.

The loading of gob of glass directly through the neck ring 31 into a solid vertical blank 30 eliminates the need for a funnel mechanism to guide the glass. This saves motion time which may be added to blank time or used to speed up the cycle. The plunger carrier, with one or more individually controlled plunger cylinders mounted thereon, depending on the number of glass articles to be formed simultaneously lowers into position on top of the neck ring 31 immediately after the gob of glass loads through the neck ring 31 into the solid blank mold 30. The pressing of glass within the solid blank mold 30 starts as the plunger carrier 32 is lowering the plunger cylinder 33 down into final aligned position. Thus, the plunger cylinder 33 has an extended retractable alignment and clamping sleeve 36 that allows early and accurate pressing without the rings being pressed open. When the plunger cylinder 33 is in its final position, it will force the plunger 34 further down into the solid blank for the final press of the parison.

Figure 6:
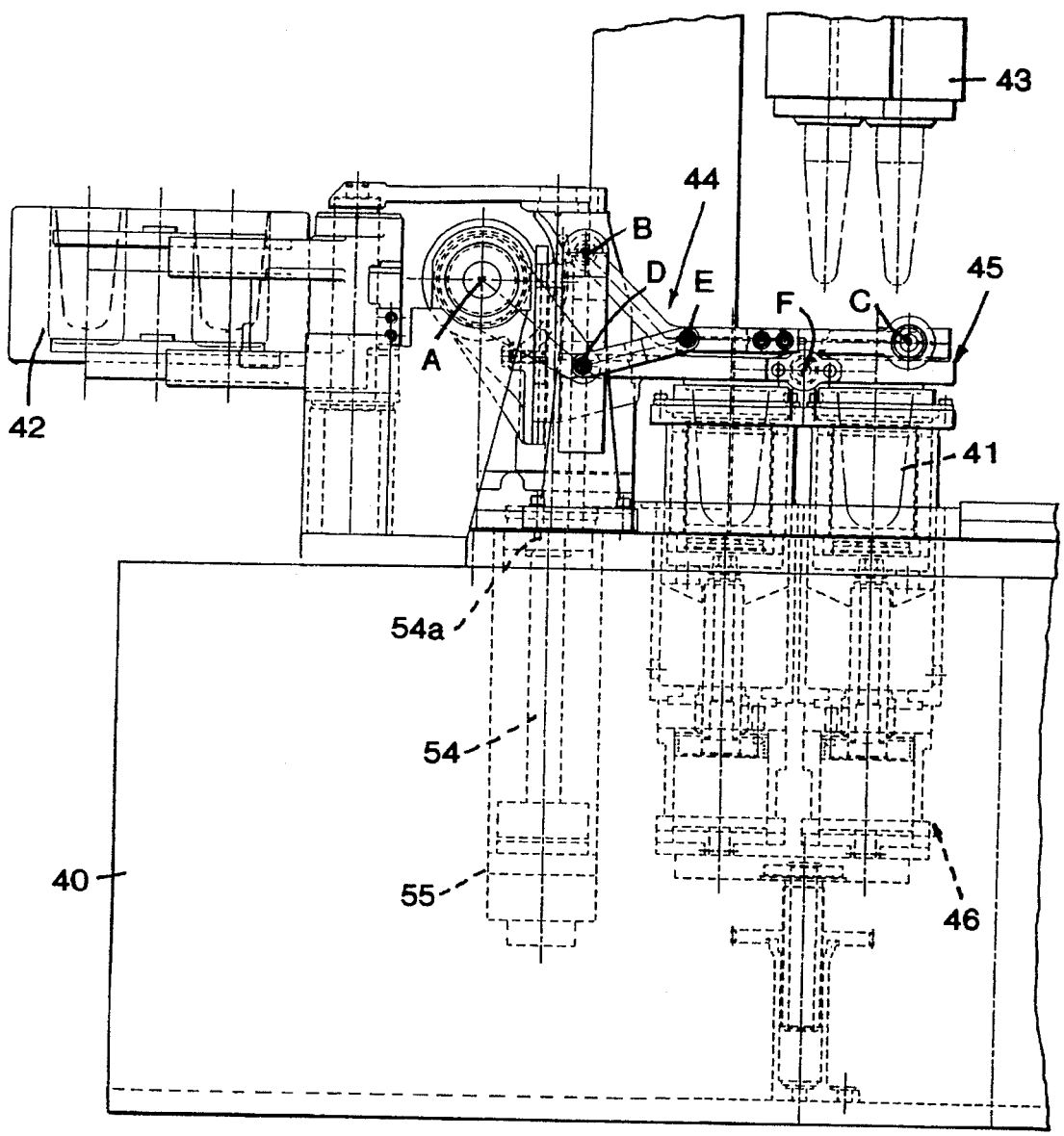
FIG. 6 is an elevational view showing an apparatus embodying the invention.

An apparatus embodying the invention for forming wide mouth glassware is shown in FIG. 6 which is basically an I.S. glass forming machine such as shown in U.S. Pat. Nos. 3,024,571 and 3,233,999, incorporated herein by reference. The apparatus shown is a double gob machine but may be a single gob or plural gob machine including triple gob and quadruple gob as is well known in the art. Such an apparatus includes a section box 40 which supports blank molds 41 at a blank forming station and blow molds 42 at a blowing station. The apparatus includes a plunger cylinder and carrier assembly 43 at the blank forming station and a transfer assembly 44 associated with a neck ring holder and transfer arm assembly 45 which normally inverts the parisons, modified as presently described. Such an apparatus includes a blank cylinder assembly 46 on which the solid blank molds 41 are mounted for movement upwardly into receiving position of glass gobs from a feeder, not shown.

Figure 7:
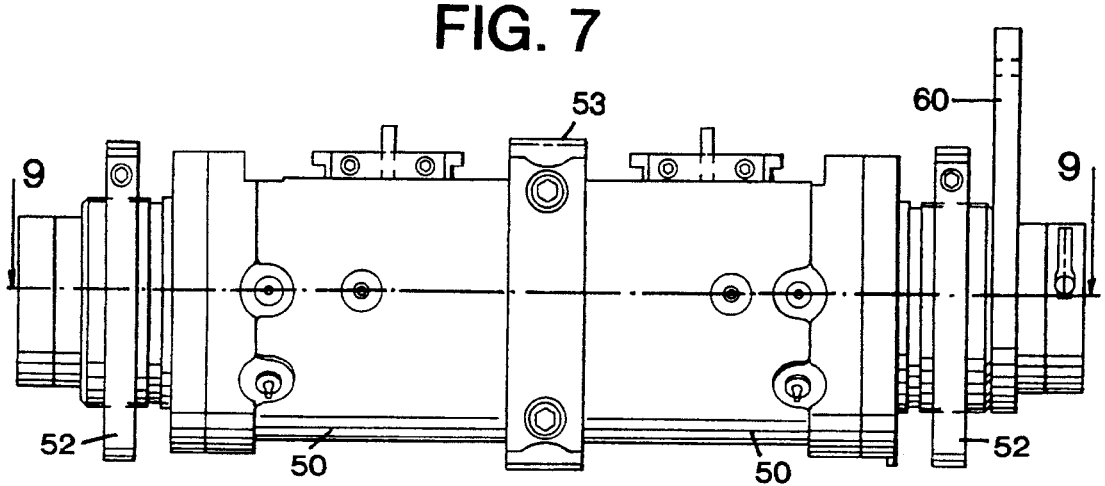
FIG. 7 is a plan view of a portion of the apparatus shown in FIG. 6.
Figure 9:
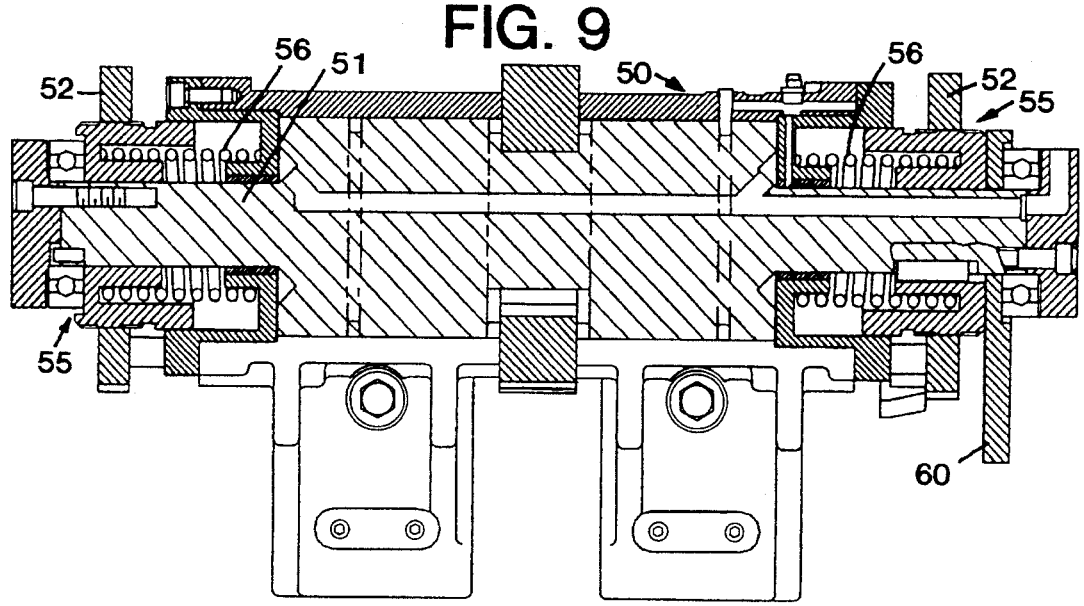
FIG. 9 is a sectional view taken along the line 9—9 in FIG. 7.
Figure 8:
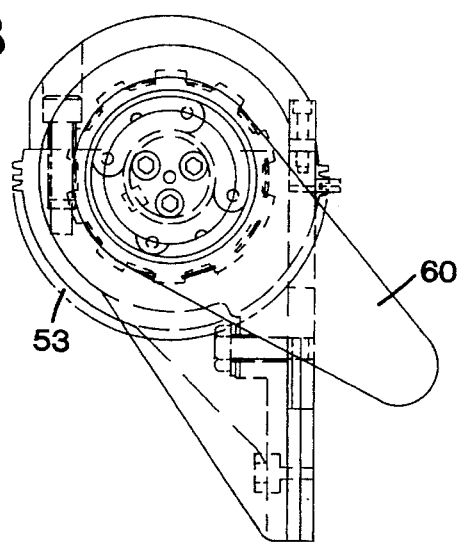
FIG. 8 is an end view taken from the right in FIG. 7.
Figure 10:
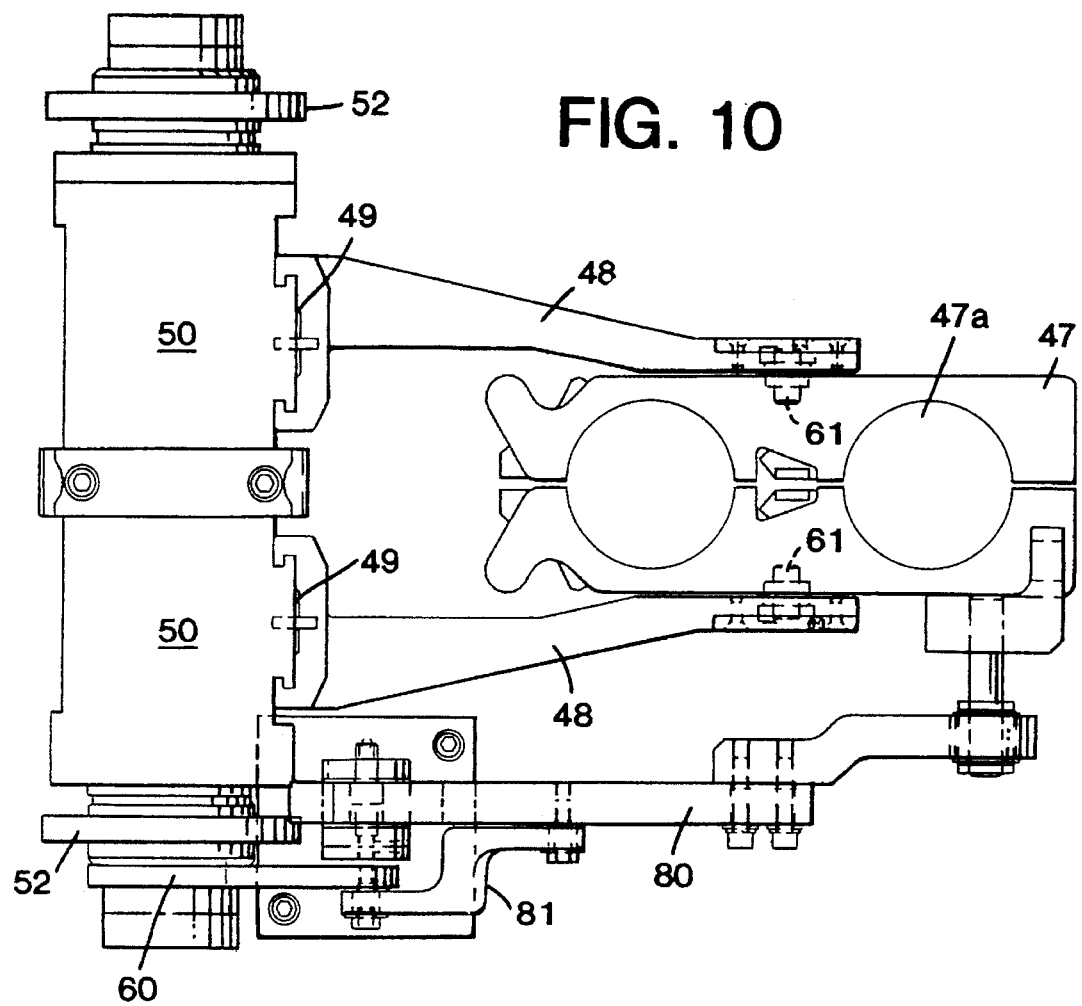
FIG. 10 is a plan view of the portion of the apparatus shown in FIGS. 7, 8 and 9 with the neck ring holder in position.
Figure 11:
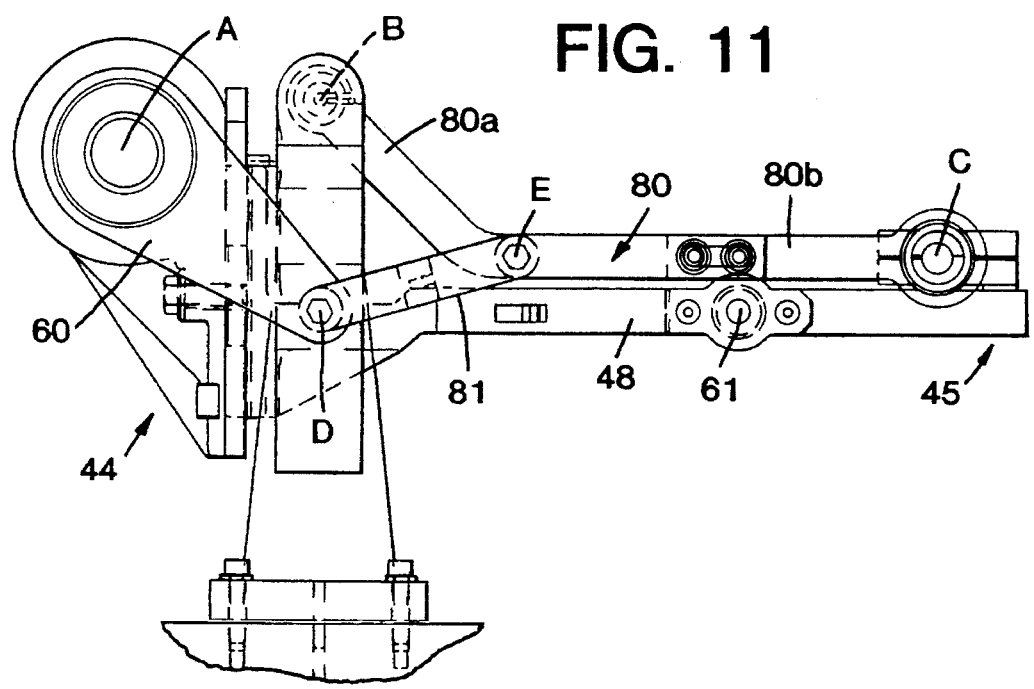
FIG. 11 is a side view of the apparatus shown in FIG. 10.

As shown in FIG. 10, the neck ring holder and transfer arm assembly 45 comprises openings 47a for a pair of neck rings 46 (FIGS. 15, 16) supported in a neck ring holder 47 on neck ring arms 48. The arms 48 are each attached by their T-slot connections to T-slot bosses 49. The bosses 49 are each an integral part of the respective sleeves 50. As shown in FIGS. 7–9, the sleeves 50 are each internally splined and fit over complementary splines on enlarged central portions of an invert shaft 51. Each of the sleeves 50 is adapted for rotary motion with the shaft 51 and axial sliding movement along shaft 51, as presented described. The shaft 51 is rotatably mounted at its ends in bearings that are held in journals on the upright bracket of the support casting attached onto the underlying frame of the machine.

The shaft 51 is rotatable to transfer the neck molds from the parison station to the blow molding station, the latter station being displaced by approximately 180° of rotary movement of the arms 48 from the parison station. The sectional, partible blow molds (not shown) are mounted in a known manner on a pair of arms which are pivoted, in scissors fashion, on a vertical center pin. The pin is rigidly mounted on the machine frame by the support casting. There are also two vertical side pivots or shafts rigidly attached to the frame by the casting, and the blow mold actuating linkages (not shown) that are connected to open and close the blow mold arms are pivoted on these pins in a known manner. These vertical shafts are herein shown to represent the blow mold position or station of the machine. The remainder of the blow mold mechanism, as well as the blank mold mechanism, have been intentionally omitted from the drawings for the sake of simplicity of illustration of the invention.

The rotation of the shaft 51 is accomplished by a pinion 53 that is rigidly secured by a key to the central part of shaft 51 and in meshing engagement with a vertically disposed rack 54a. The rack 54a is on the upper end of the piston rod 54 (FIG. 6) of a fluid pressure operated cylinder-piston motor 55. The reciprocating motion of rack 54a transmits a rotary motion to the pinion 53 which in turn rotates shaft 51. The neck ring arms 48 are moved in a rotary invert path by the splined connection between shaft 51 and the two carrier sleeves 50.

The neck ring arms 48 are moved toward and away from each other for opening and closing the neck ring holders 47 and axially of the shaft by the sleeves 50 sliding along the splines on shaft 51. The opening motion is controlled by stops 52. This movement is accomplished by opposed, single-acting, fluid-pressure operated, cylinder-piston assemblies 55 which function against springs. This apparatus for rotating is old and well known in I.S. machines as shown, for example, in U.S. Pat. No. 3,233,999, incorporated herein by reference. In accordance with the invention, a crank arm 60 is provided on shaft 51 for rotation therewith.

The apparatus (FIG. 12) for moving the plunger carrier toward and away from operating position is substantially like that in U.S. Pat. No. 3,024,571, incorporated herein by reference, except that it is operated from above the blank molds rather than from below.

In accordance with the invention, the partible or split neck rings 46 are supported on a solid neck ring holder 47 which is pivoted intermediate to its ends on the arms 48. The neck ring arms 48 have pivot shafts 61 on the arms 48 that extend inwardly into recesses in the neck ring holders 47 (FIG. 10).

Figure 15:
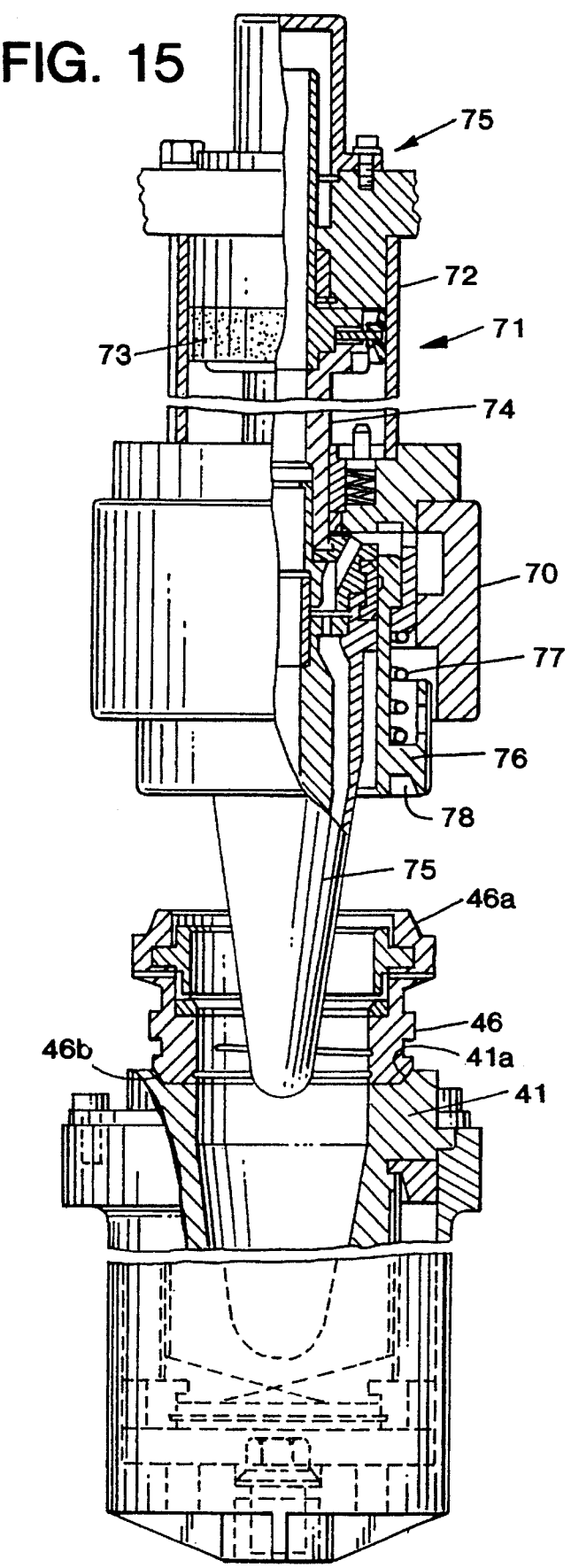
FIG. 15 is a vertical sectional view of a plunger mechanism.
Figure 16:
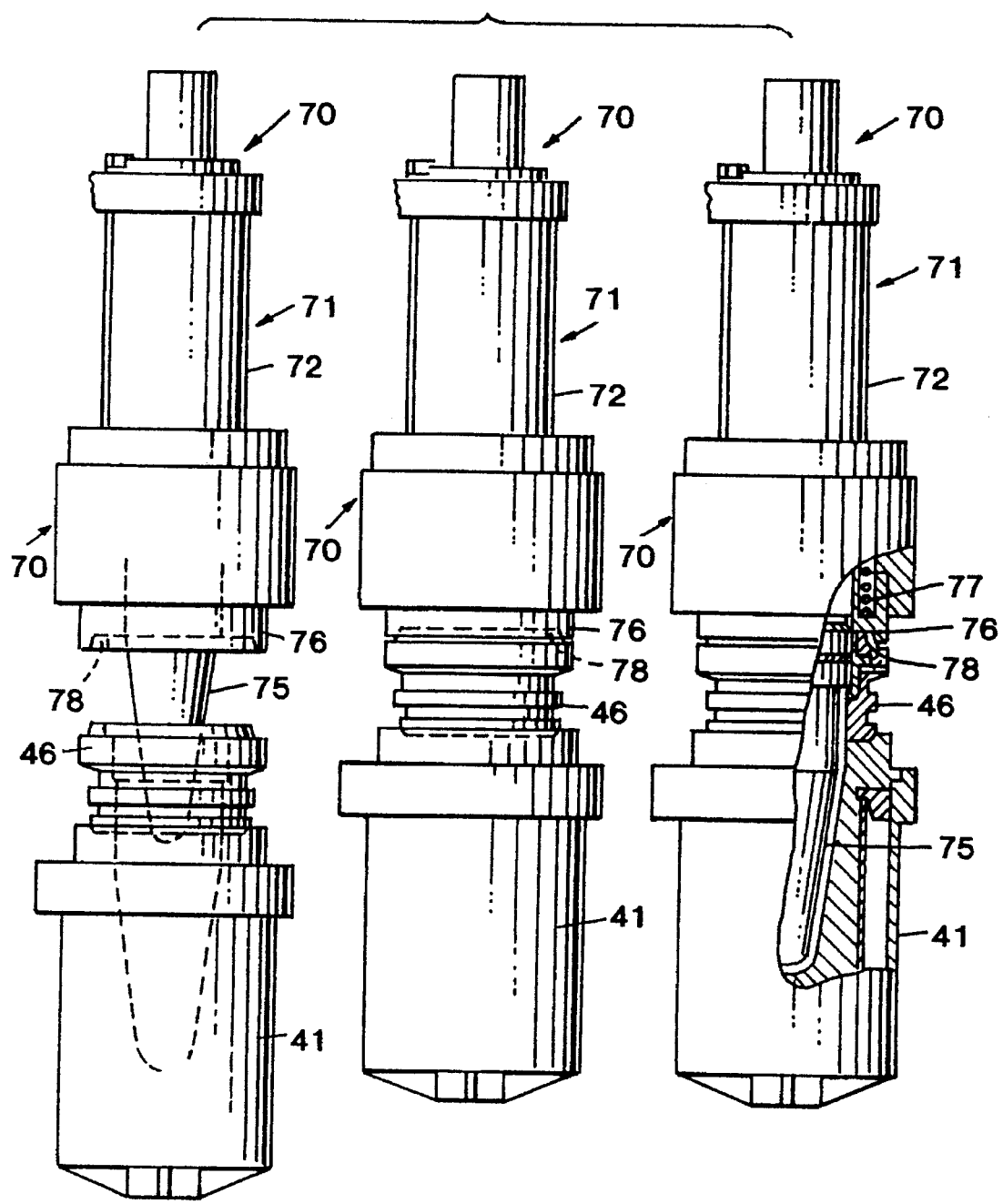
FIG. 16 is a view showing successive steps in forming a parison.
Figure 17:
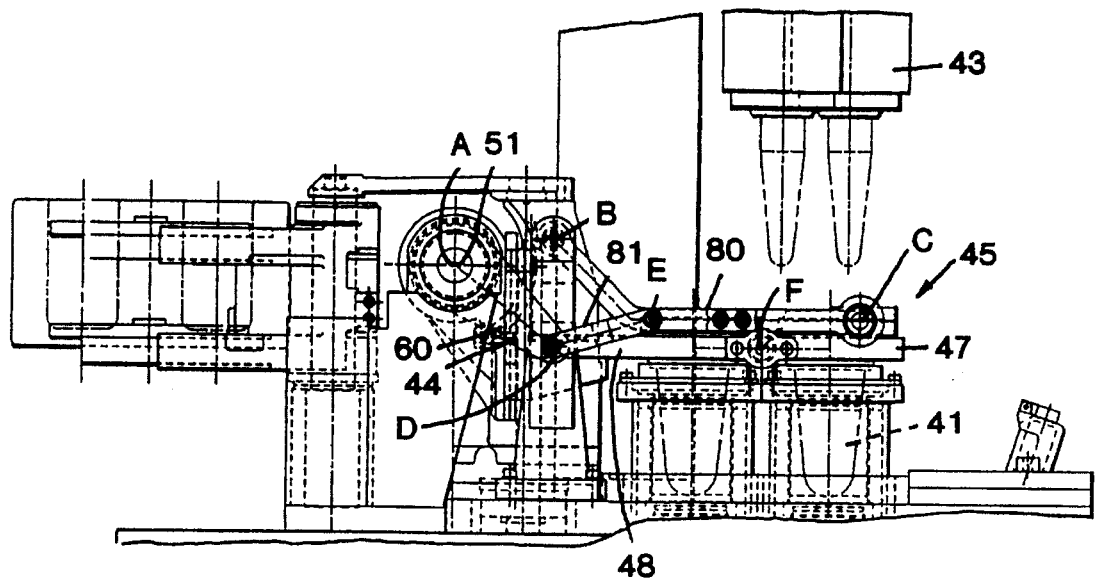
FIGS. 17, 18, 19 and 20 are views of a portion of the apparatus shown in FIG. 6 during successive positions of the apparatus.
Figure 18:
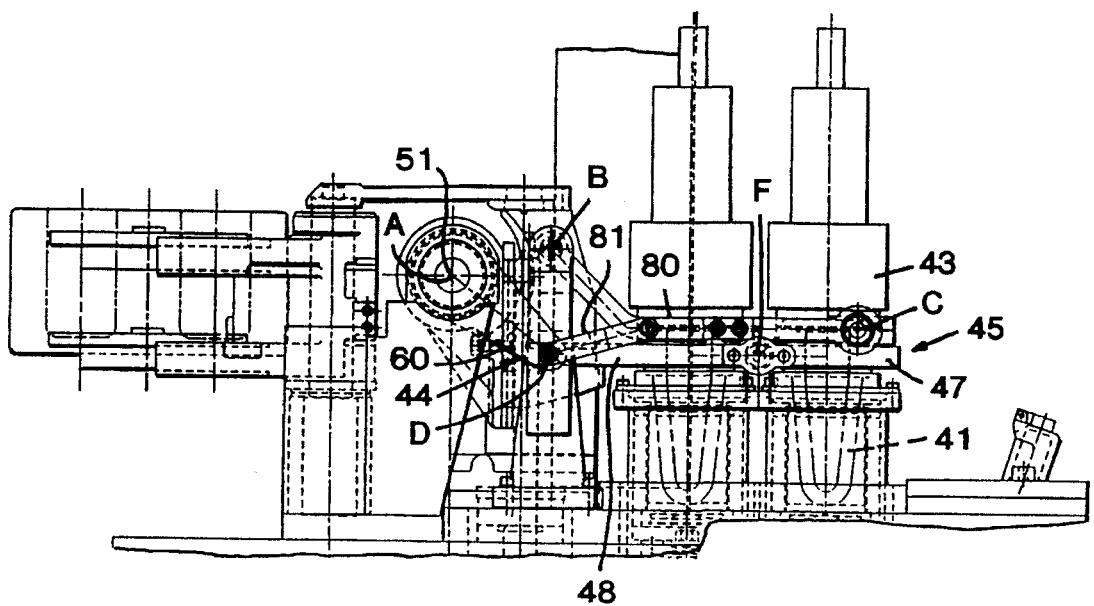
Figure 19:
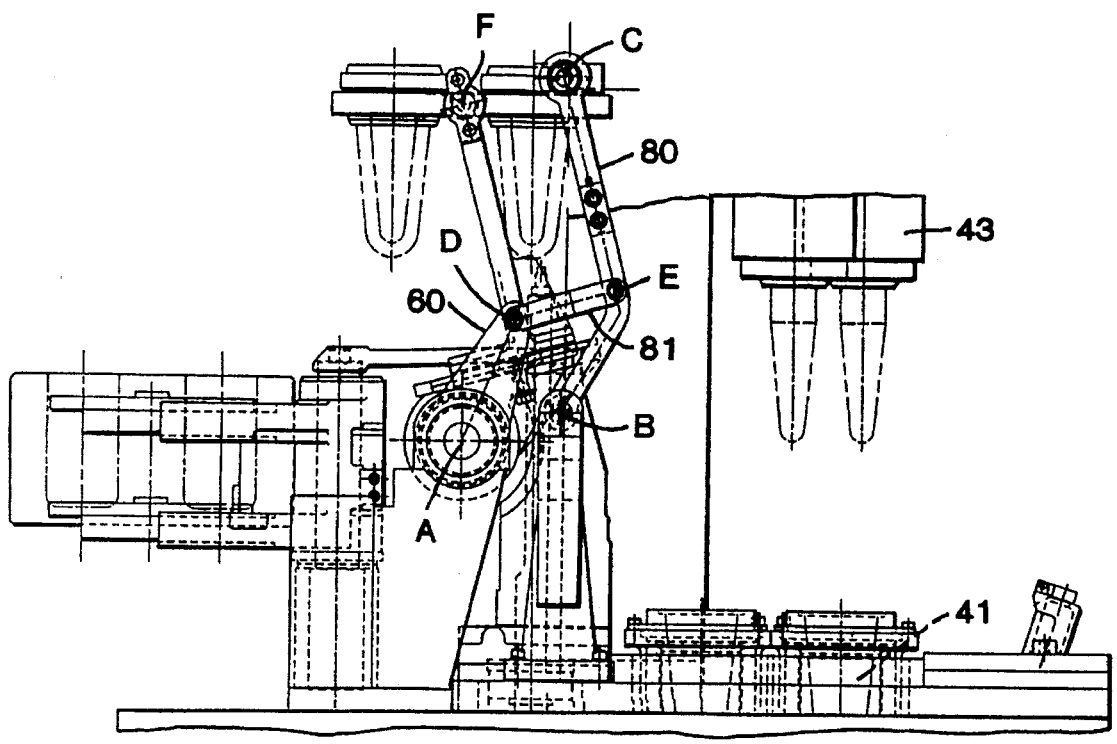

Referring to FIG. 15, the plunger carrier 70 carries two plunger assemblies 71, each of which comprises a cylinder 72 having a piston 73 with a rod 74 on which plunger 75 is mounted. A sleeve 76 is mounted on the lower end of the carrier 70 and is yieldingly urged downwardly by a spring 77. The lower end of the sleeve 76 is formed with an annular trapezoidal groove 78 which is adapted to engage a complementary annular bead 46a on the neck ring 46 to align the plunger and neck ring accurately. There is also an annular bead 46b on the bottom of the neck ring 46 to engage a complementary groove 41a on the blank mold for alignment between neck ring and blank mold.

Referring to FIGS. 6, 10, 11 and 17–21, in accordance with the invention, the transfer apparatus comprises a transfer arm 80 pivoted at one end about a second fixed horizontal axis B spaced from the axis A of shaft 51 and pivoted at the other end to a neck ring arm 48 at axis C. A link 81 is pivotally connected at one end to crank 60 at axis D and at the other end to a point intermediate the ends of transfer arm 80 at axis E. Transfer arm 80 includes a short portion 80a and a long portion 80b at an obtuse angle to one another and the pivot axis E is at the juncture of the two portions. As a result as shown in diagrammatic view FIG. 21, the radius of movement $R_1$ of the pivot axis on crank 60 is the same as the radius $R_2$ of the movement of pivot E about axis B; and the radius $R_3$ of the movement of pivot axis F about axis A is the same as radius $R_4$ of pivot axis C about axis B. The crank 60 and short portion 80a of the transfer arm 80 remain parallel and the long portion 80b and the neck ring arm 48 remain parallel in all positions.

Figure 12:
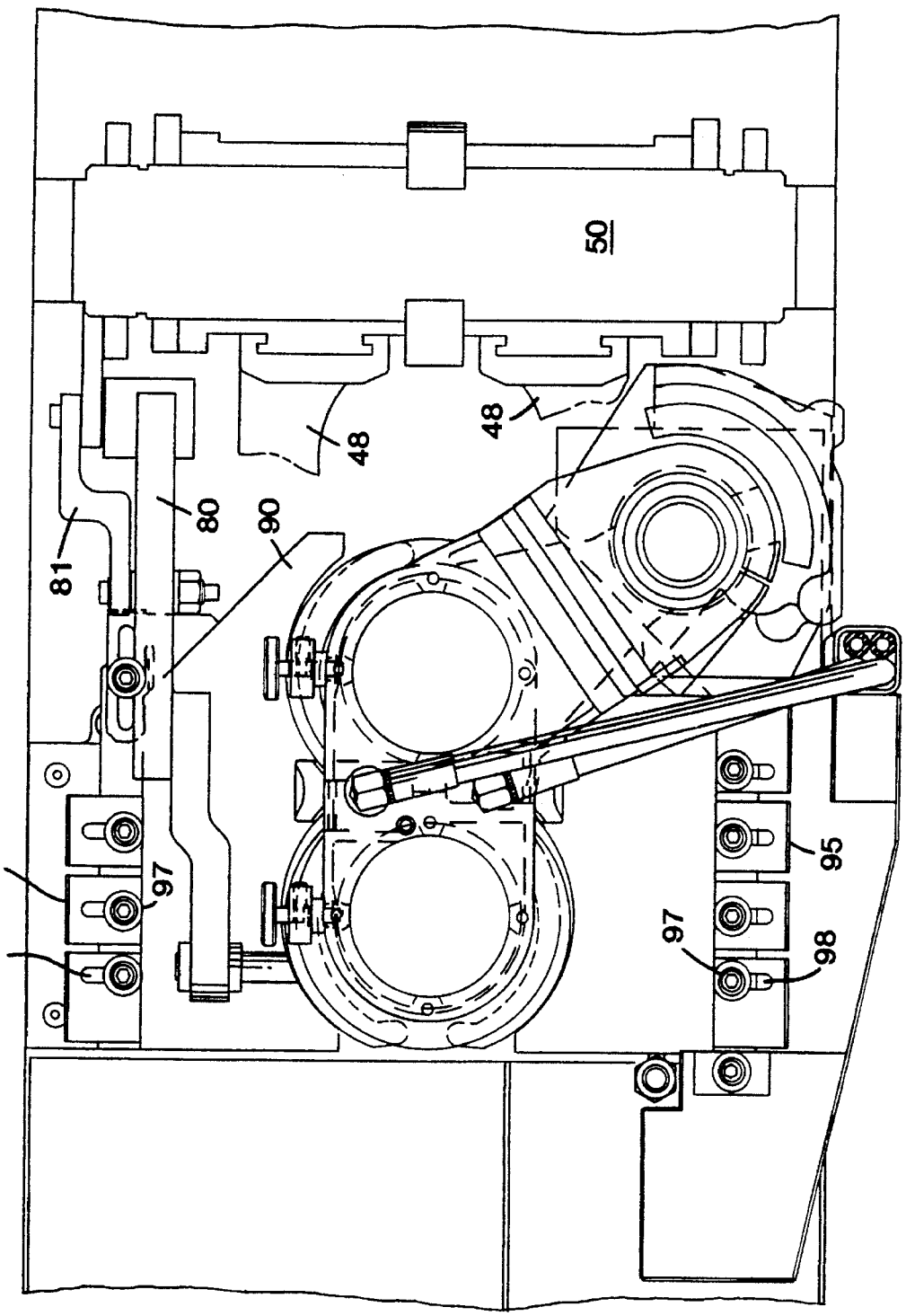
FIG. 12 is a plan view of another portion of the apparatus shown in FIG. 6.
Figure 13:
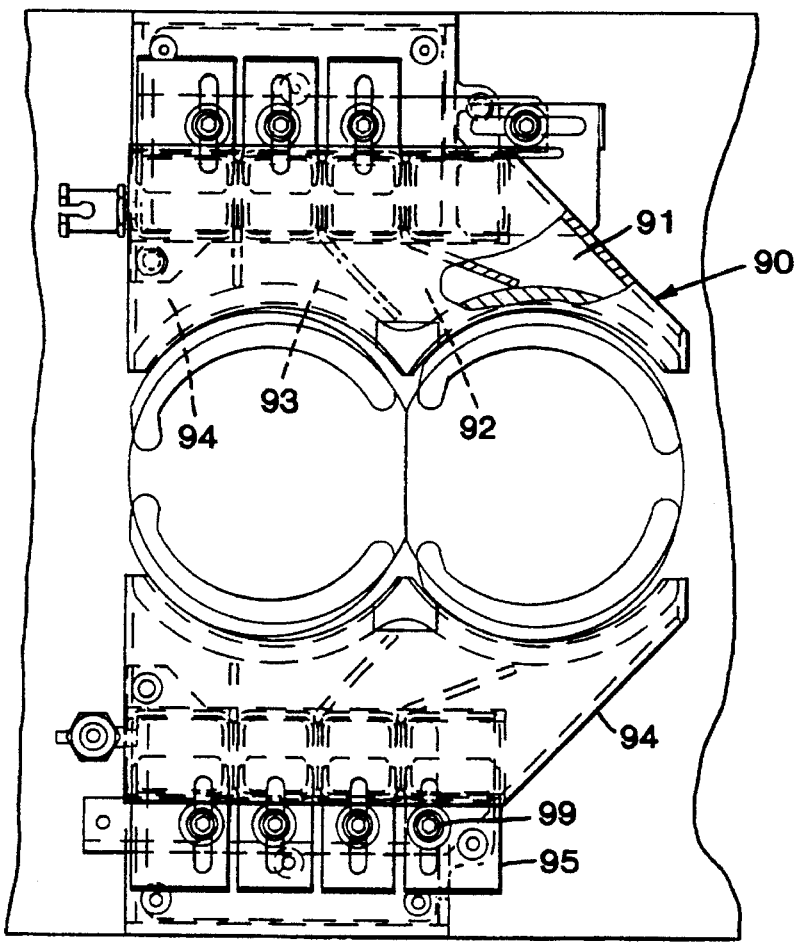
FIG. 13 is a fragmentary plan view of a cooling apparatus for the neck rings.
Figure 14:
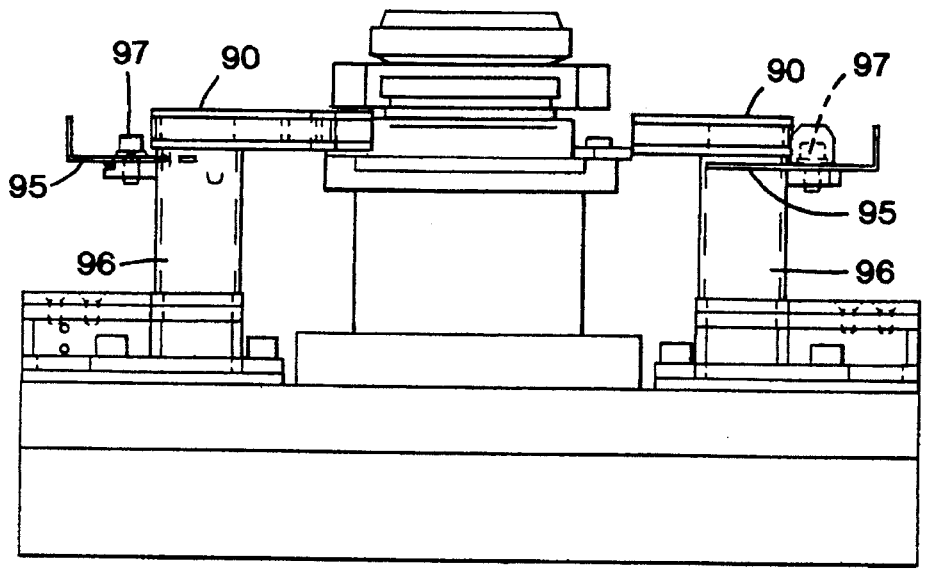
FIG. 14 is an end view taken from the right in FIG. 13.

Referring to FIGS. 12–14, provision is made for cooling the neck rings 46 by air supplied through opposed arcuate plenums 90. Each plenum 90 includes a plurality of chambers 91, 92, 93, 94. The chambers 91–94 are supplied by adjustable plates 95 such that the amount of air to each chamber can be adjusted by varying the size of the inlet to each chamber from the air source 96. Each plate is held in adjusted position by a bolt 97 extending throgh a slot 98 in the plate 95 and into a threaded hole 99.

In operation, dual gobs are fed to the blank molds through the neck rings and the apparatus is operated in accordance with the method as described in connection with FIGS. 1–5.

Figure 20:
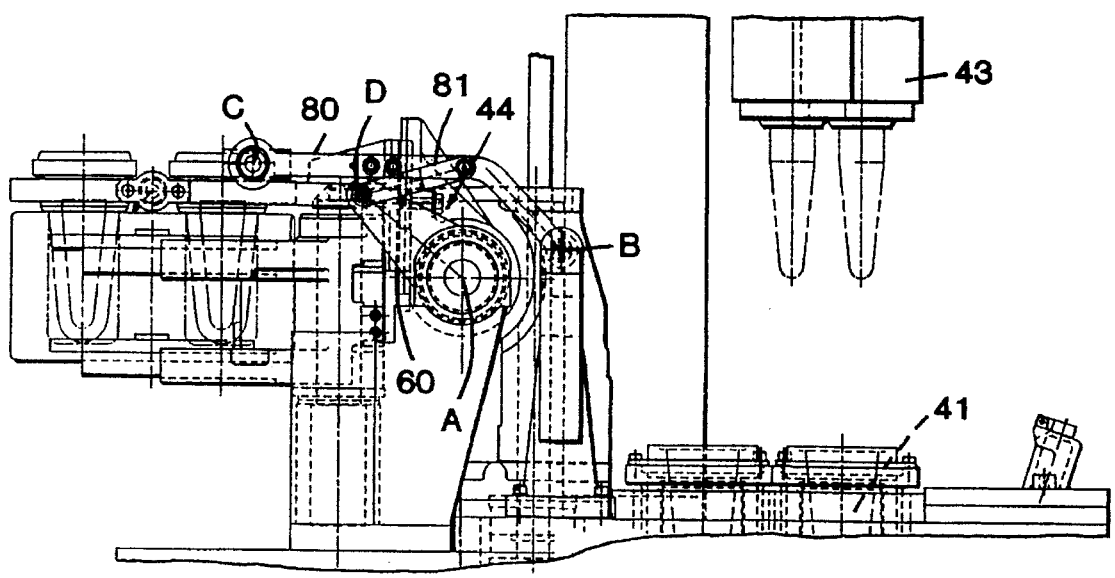

Referring to FIGS. 17–20, the apparatus is shown in various operating positions: The delivery of the gobs to the blank molds and the movement of the plunger carrier 70 into overlying relation to the blank molds (FIG. 17), the pressing of the glass (FIG. 18); the movement of the parisons toward the blow mold station (FIG. 19); and the positioning of the parisons to the blow mold station for blowing (FIG. 20).

Figure 21:
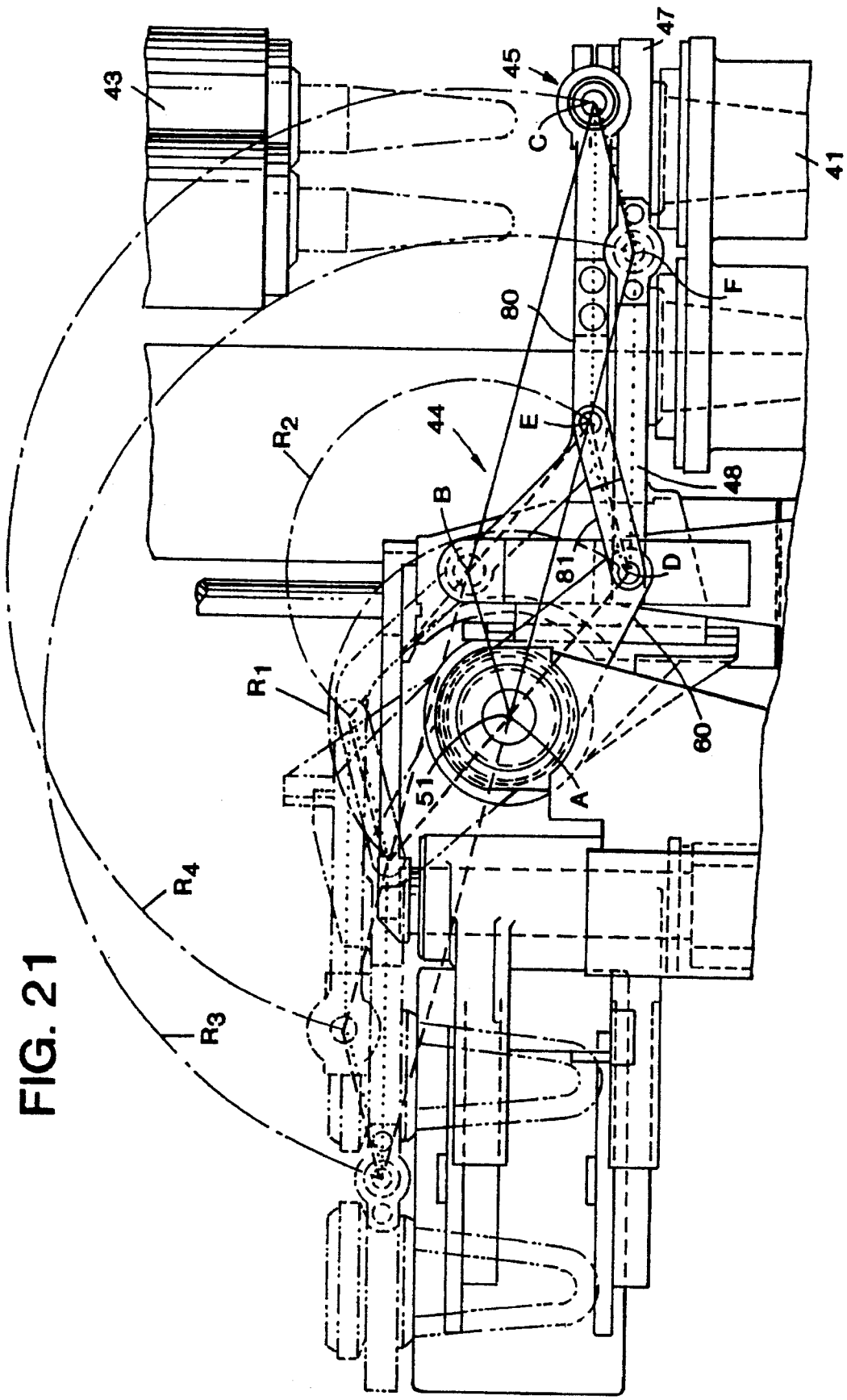
FIG. 21 is a schematic view showing the movement of the parisons between pressing position and blowing position.

FIG. 21 is a diagrammatic view showing how the transfer apparatus having movement about two horizontal axes maintains the parison in upright position.

No funnel mechanism is needed to guide the glass through the neck ring and into the blank which saves additional time in the forming cycle. In other forming processes on the I.S. machine, the gob of glass lies at the bottom of the blank or on top of a plunger while other mechanisms are moving out of the way or into position to begin the pressing. The cycle time lost for this movement causes excessive and uneven chilling of the glass that gives poor distribution in the jar when it is blown into final shape in the blow mold.

Unlike the sprockets, chains, and gears used to transfer the parison as stated in U.S. Pat. No. 4,004,906, this process uses a positive linkage to keep the neck ring holder horizontal and more stable resulting in less finish defects.

It can thus be seen that there has been provided a novel method and apparatus which is intended to form wide mouth glassware; which method and apparatus provides wide mouth glassware and allows the parison to be formed more quickly with less pressing force such that the glassware is better quality; wherein single or multiple glass gobs can be processed; wherein the gobs of glass are preferably fed through the neck ring into a vertical solid blank; wherein the process provides for a quicker and more accurate alignment for the plunger with less movement of the glass within the blank; wherein the process does not require a funnel mechanism nor a baffle mechanism and wherein the apparatus is capable of functioning in a reliable manner at high speeds with minimal maintenance.

What is claimed is:

1. An apparatus for making wide-mouth glassware comprising a solid blank mold, a split blow mold comprising mold halves, a split neck ring, a plunger carrier having a movable plunger therein, means for positioning the neck ring on said blank mold, means for delivering a gob of glass to said blank mold, means for positioning said plunger carrier into engagement with said neck ring such that the plunger extends into the blank mold to a first position, said plunger carrier including means for extending the plunger further into said blank mold to a first position to deform the glass and force the glass into the neck ring to form a parison, and retracting the plunger and moving the plunger carrier away from the neck ring, means for moving the neck ring with the parison thereon to a position between the open blow mold halves while maintaining the parison in vertical upright position and returning the neck ring to it original position adjacent the blank mold while the parison is being blown, means for opening the neck ring to release the parison in the blow mold, means for closing the blow mold about the parison and blowing the parison into a hollow glass article, said plunger extending from said plunger carrier such that the plunger begins to press glass as the plunger carrier moves into engagement with said neck ring, said plunger carrier including means for aligning the plunger carrier with said neck ring, said plunger carrier including means yieldingly engaging said neck ring, a neck ring arm, means pivoting said neck ring arm about a first fixed horizontal axis, a neck ring holder for holding said neck ring, means pivotally supporting said neck ring holder on said neck ring arm, means for moving said blank mold upwardly into position for receiving the glass gob, said means for moving the neck ring with the parison thereon to a position between the open blow mold halves while maintaining the parison in vertical upright position comprising a transfer arm, means pivoting one end of the transfer arm about a second fixed horizontal axis spaced from the first horizontal axis, means pivoting the other end of the transfer arm to the neck ring holder, means pivotally connecting said transfer arm to said first horizontal axis such that the pivotal movement of said neck ring arm about said first horizontal axis causes said transfer arm to move about said second horizontal axis and maintain said parison in vertical upright position as the neck ring is moved to a position between the open blow mold.

2. The apparatus set forth in claim 1 including a crank arm that is rotated by said means pivoting said neck ring arm about the first horizontal axis and means pivotally connecting said transfer arm to said crank arm.

3. The apparatus set forth in claim 2 including a plurality of split neck rings on said neck ring holder, a plurality of blank molds, a plurality of plungers and a plurality of split blow molds.

4. The apparatus set forth in claim 3 including a pair of plenums on said neck ring arm, each having an arcuate opening adjacent said neck ring halves, each plenum including a plurality of chambers having inlets and means controlling the flow of air to each said chamber.

5. The apparatus set forth in claim 4 wherein said means for adjusting flow comprises a plate associated with the inlet to each chamber and means for adjusting the position of said plate with respect to its respective chamber.

6. The apparatus set forth in claim 5 wherein said means for adjusting flow comprises a bolt extending externally through a slot on said plate and a nut threaded on said bolt.

7. In an apparatus for making glassware wherein individual stations are provided including a blank mold station, a split blow mold station spaced from said blank mold station including mold halves defining a blank mold cavity, a split neck ring, means for positioning the neck ring on said blank mold, means for delivering a gob of glass to said blank mold, such that the glass gob can be formed into a parison at the blank station, transferred to the blow mold station and blown into a hollow article at the blow mold station, the improvement comprising a solid blank mold at said blank mold station, a split blow mold at said blow mold station comprising split mold halves, means supporting the blank mold in upright position at the blank mold station, means for moving the neck ring with the parison thereon to a position between the open blow mold halves while maintaining the parison in vertical upright position and returning the neck ring to it original position adjacent the blank mold while the parison is being blown, said means including a neck ring arm, means pivoting said neck ring arm about a first fixed horizontal axis, a neck ring holder for holding said neck ring, means pivotally supporting said neck ring holder on said neck ring arm, a transfer arm, means pivoting one end of the transfer arm about a second fixed horizontal axis spaced from the first horizontal axis, means pivoting the other end of the transfer arm to the neck ring holder, means pivotally connecting said transfer arm to said first horizontal axis such that the pivotal movement of said neck ring arm about said first horizontal axis causes said transfer arm to move about said second horizontal axis and maintain said parison in vertical upright position as the neck ring is moved to a position between the open blow mold.

8. The apparatus set forth in claim 7 including a crank arm that is rotated by said means pivoting said neck ring arm about the first horizontal axis and means pivotally connecting said transfer arm to said crank arm.

9. The apparatus set forth in claim 8 including a plunger carrier associated with said blank mold, means for positioning said plunger carrier into engagement with said neck ring directly through the neck ring, said plunger carrier including means for extending the plunger further into said blank mold to a second position to deform the glass and force the glass into the neck ring to form a parison, and retracting the plunger and moving the plunger carrier away from the neck ring.

10. The apparatus set forth in claim 9 wherein said plunger extends from said plunger carrier such that the plunger begins to press glass as the plunger carrier moves into engagement with said neck ring.

11. The apparatus set forth in claim 10 wherein said plunger carrier includes means for aligning the plunger carrier with said neck ring.

12. The apparatus set forth in claim 11 wherein said plunger carrier includes means yieldingly engaging said neck ring.

13. The apparatus set forth in claim 12 including a pair of plenums in said neck ring arm, each having an arcuate opening adjacent said neck ring halves, each plenum including a plurality of chambers having inlets and means controlling the flow of air to each said chamber.

14. The apparatus set forth in claim 13 wherein said means for adjusting flow comprises a plate associated with the inlet to each chamber and means for adjusting the position of said plate with respect to its respective chamber.

15. The apparatus set forth in claim 14 wherein said means for adjusting flow comprises a bolt extending externally through a slot on said plate and a nut threaded on said bolt.

16. The apparatus set forth in any one of claims 7–15 including a plurality of neck rings on said neck ring holder, a plurality of blank molds, and a plurality of blow molds.

17. In an apparatus for making glassware wherein individual stations are provided including a blank mold station, a split blow mold station spaced from said blank mold station including mold halves defining a blank mold cavity, a split neck ring, means for positioning the neck ring on said blank mold, means for delivering a gob of glass to said blank mold, such that the glass gob can be formed into a parison at the blank station, transferred to the blow mold station and blown into a hollow article at the blow mold station, the improvement comprising means supporting the blank mold in upright position at the blank mold station, means for moving the neck ring with the parison thereon to a position between the open blow mold halves while maintaining the parison in vertical upright position and returning the neck ring to it original position adjacent the blank mold while the parison is being blown, said means including a neck ring arm, means pivoting said neck ring arm about a first fixed horizontal axis, a neck ring holder for holding said neck ring, means pivotally supporting said neck ring holder on said neck ring arm, a pair of plenums on said neck ring arm, each having an arcuate opening adjacent said neck ring halves, each plenum including a plurality of chambers and means controlling the flow of air to each said chamber, said means for adjusting flow comprising a plate associated with the inlet to each chamber and means for adjusting the position of said plate with respect to its respective chamber, said means for adjusting flow comprising a bolt externally through a slot on said plate and a nut threaded on said bolt.

18. For use in an apparatus wherein a glass gob is formed at a blank station and transferred to a blow molding station, a retractable alignment and clamping plunger carrier comprising a plunger, a neck ring, said plunger carrier including means for extending said plunger relative to said carrier while plunger carrier is being positioned on said neck ring such that the plunger begins to press glass as the plunger carrier moves into engagement with said neck ring, said plunger carrier including means for aligning the plunger carrier with said neck ring, said plunger carrier including means yieldingly engaging said neck ring, a neck ring arm, means pivoting said neck ring arm about a first fixed horizontal axis, a neck ring holder for holding said neck ring, means pivotally supporting said neck ring holder on said neck ring arm, means for moving the neck ring with the parison thereon to a position between the open blow mold halfs while maintaining the parison in vertical upright position comprises a transfer arm, means pivoting one end of the transfer arm about a second fixed horizontal axis spaced from the first horizontal axis, means pivoting the other end of the transfer arm to the neck ring holder, means pivotally connecting said transfer arm to said first horizontal axis such that the pivotal movement of said neck ring arm about said first horizontal axis causes said transfer arm to move about said second horizontal axis and maintain said parison in vertical upright position as the neck ring is moved to a position between the open blow mold.

19. The apparatus set forth in claim 18 including a crank arm that is rotated by said means pivoting said neck ring arm about the first horizontal axis and means pivotally connecting said transfer arm to said crank arm.

20. The apparatus set forth in claim 19 including a plurality of neck rings on said neck ring holder, a plurality of blank molds, a plurality of plungers and a plurality of blow molds.

21. The apparatus set forth in claim 20 including a pair of plenums on said meck ring arm, each having an arcuate opening adjacent said neck ring halves, each plenum including a plurality of chambers having inlets and means controlling the flow of air to each said chamber.

22. The apparatus set forth in claim 21 wherein said means for adjusting flow comprises a plate associated with the inlet to each chamber and means for adjusting the position of said plate with respect to its respective chamber.

23. The apparatus set forth in claim 22 wherein said means for adjusting flow comprises a bolt extending externally through a slot on said plate and a nut threaded on said bolt.

* * * * *